Jan. 18, 1938.                E. G. COOK                2,105,939
                                BARREL
                         Filed Sept. 23, 1933
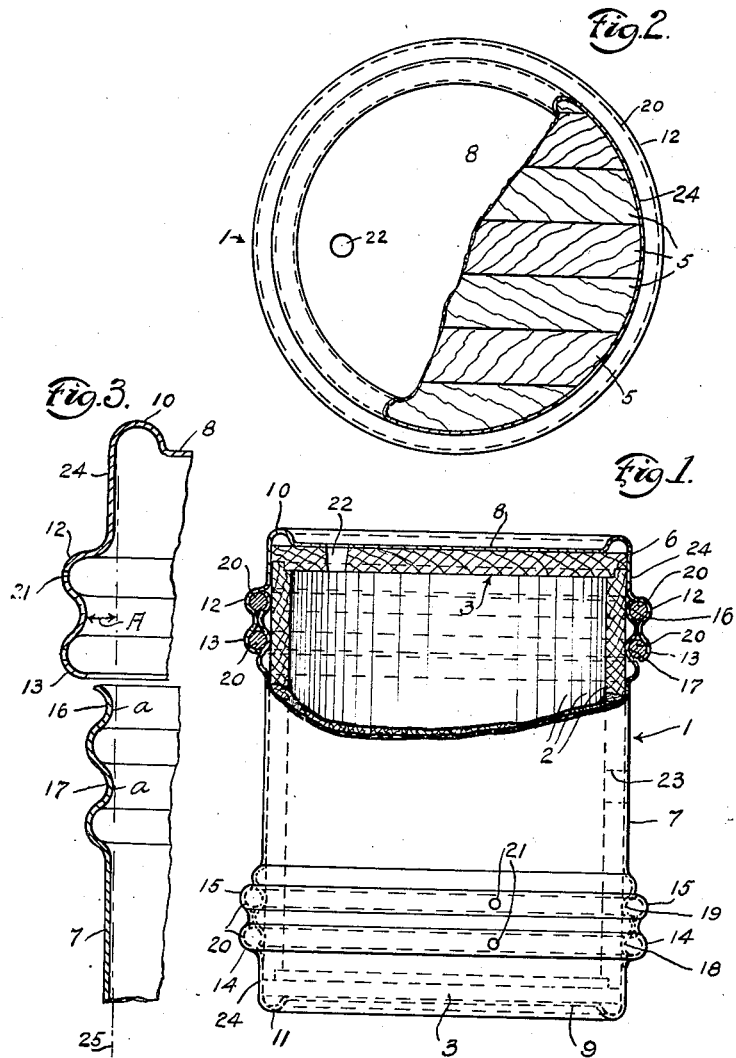
INVENTOR
*Edward G. Cook;*
BY
*Harold D. Penney*   ATTORNEY.

Patented Jan. 18, 1938

2,105,939

UNITED STATES PATENT OFFICE 2,105,939

BARREL

Edward G. Cook, Brooklyn, N. Y., assignor of one-fourth to Isadore Goldberg, New York, N. Y.

Application September 23, 1933, Serial No. 690,650

8 Claims. (Cl. 220—5)

The present invention relates to an improvement in barrels for containing liquids, such as beer and the like, and has for its main object the provision, in a metal outer protective cask of an inner liner of material, preferably wood, which does not affect the flavor of the beverage, and, at the same time, prevents the liquid from attacking the outer metallic cask.

A further feature of advantage is in the method of making and assembling the outer cask about the inner container in a firm, embracing grip, so as to prevent the inner container from being loosely mounted in the cask.

A further object is in the manner in which the cask is made, and assembled into a complete unit, from separate component units.

These and other features will be noted as the herein description proceeds, and it is obvious that modifications may be made in the methods and structures herein, without departing from the spirit hereof, or the scope of the appended claims.

In the drawing,

Fig. 1 is a view of the barrel, in elevation, with parts broken away to show the details of structure;

Fig. 2 is a plan view of Fig. 1, with parts broken away to show details; and

Fig. 3 is a fragmental enlarged view, partly in section, showing the details of jointure of two of the cask keying elements before assembly into cask formation.

The barrel comprises an inner container, hereinafter called the keg, preferably made of wood, or pressed up fibre, or similar pulp. In the present showing, the keg is made up of two circular wooden heads 3—3, these being formed of a plurality of wood slabs 5, as in Fig. 2, which are joined together in a liquid tight manner, and which heads are provided at their perimeters with a rabbeted groove 6, as in Fig. 1 to receive the ends of the staves 2 therein, the ends of the staves being also rabbeted, to interfit in the said groove 6. The staves 2 are also assembled to each other and the heads, in a liquid tight manner.

As thus described, the keg is made cylindrical, without chimes, and its outer surface is smooth, so as to be easily and firmly encompassed and embraced by the metallic cask, in assembly.

The cask, generally denoted by 1, Fig. 1, may be comprised of two or more parts, in the present instance, it is shown as being made up of three parts, two of them forming the opposite, duplicate head shells 8 and 9, and an intermediate, cylindrical tubular shell 7, the head shells and tubular shell being of sheet metal.

The intermediate shell 7 is open on both ends, while the heads are drawn up with their cylindrical wall portions 24 joining the head shells 8 and 9 through integral, formed up chimes 10 and 11, as illustrated in Figs. 1 and 3.

The wall portions 24 of the heads 8 and 9, as is fully illustrated in Fig. 3, have their lower open ends convoluted into plural, spaced cylindrical convolutions 12 and 13. These convolutions may be of any cross-sectional contour or shape, but as illustrated in Figs. 1 and 3, they may be of semi-spherical cross section, so that when assembled with the ends of the shell 7, later to be described in detail, they form, in substance, two completely encircling tubular channels around the keg, of circular cross section, as at 20, Fig. 1.

The convolutions 12 and 13, as will be noted in Fig. 3, are formed, spaced away from the plane line 25, which line represents the outer surface of the keg, and this spacing A, is arranged to allow the convolutions 12—13 to be slipped over and outside of the convolutions 16 and 17, on the ends of shell 7, said convolutions 16 and 17 being of similar form and dimensions, but of reverse, registering symmetry to the convolutions 12 and 13. Further, the convolutions 16—17 at their bottoms a—a contact with the keg wall plane 25, Fig. 3, as does the central, unconvoluted portion of inner shell 7.

As described, and in the position shown in Fig. 3, the head shell 8, is moved down over shell 7, until the convolutions 12—13 are positioned over, and in contact with the tops of convolutions 16—17, and thus they form dual encircling tubular keg ducts 20—20 about the keg, in assembly, as previously described.

Both ends of the inner, open ended shell 7 are provided with convolutions, the second set being 18 and 19, shown dotted in Fig. 1.

Head shell 9 is also provided with convolutions, as described for shell 8, shell 9, at the end of its open ended wall 24 being provided with convolutions 14 and 15 shown in Fig. 1.

In assembly, the keg having first been assembled in a liquid tight manner and smoothed up, as to its exterior, the inner shell 7 with its convoluted ends is forced over the keg to a central position. Then the head shells 8—9 are forced over the keg ends until they contact with the head ends of the keg, thus locating the convolutions of the shell and heads in opposed, duct forming position, as shown in Fig. 1. After this assembly, it is necessary to key or bond the cask assembly to the keg and this is accomplished by filling the ducts with a suitable bonding or cement 20—20, Fig. 1, which, after it hardens, seals and bonds the shell and heads of the cask together. During this operation the cask may be kept under pressure on its heads to hold them firmly to the keg until the cement is firmly set.

In order to fill the ducts with cement, holes 21—21, Fig. 1, are located in each convolution 12—13—14—15 to permit of the introduction of the key forming cement or plastic.

Openings 22 and 23, Figs. 1 and 2, may be provided to form bung holes in the completed barrel.

It will thus be seen that the barrel, made up of a sealed cask having an inner liquid proof container, which protects the liquid contents, preserves the cask from rust and corrosion, is rigid and strong, and the key ducts form spaced solid rolling hoops on the barrel as well as forming means to hold the assembly rigidly together.

Having thus described the invention what is claimed is:

1. A cask comprising drawn metallic heads having tubular wall portions with plural convoluted key-forming means thereon; an intermediate shell, said shell having plural convoluted key-forming portions thereon constructed to underlie said first named convoluted key-portions; and a pourable hardenable bonding means in said key forming portions and moldable thereby, to bond said heads and shell together.

2. A barrel comprising a keg mounted within a cask, said cask comprising body and head forming shells, convolutions on each of said shells and a settable plastic means in said convolutions for joining and sealing said shells about said keg.

3. In combination, an inner tubular member; an inner head engaging the end of the tubular member; an outer tubular shell fitted tightly around said inner tubular member and provided at the end with fastening means; and an outer head-shell having a flange portion engaging the end margin of said inner tubular member and having engaging means cooperating with said fastening means to lock the head shell on the outer tubular shell; the inner head being removable from the inner tubular member while the latter is intact and the outer tubular member is thereon.

4. A method of assembling a container comprising an inner tubular member; an inner head at each end of said member adapted to engage under pressure the end edge face of the tubular member flush with the outer side face of the tubular member; a head-shell on each end of the inner tubular member, each having a flange portion embracing said inner tubular member; said method comprising pressing said head-shells tightly against the outer broad face of said heads; and locking said shells together while said head shells are pressing against the heads.

5. A method of assembling a barrel comprising an inner non-metallic keg, and an outer metallic cask having key forming convolutions thereon, said method consisting in assembling the cask to the exterior of the keg, then introducing a hardenable compound into the key-forming convolutions, and then putting the barrel so formed under pressure until the hardenable compound has become hardened in cask holding keys.

6. A metal shell for a cask comprising opposed ends having head portions and coacting cylindrical wall portions including outer circumferential key forming convolutions, each head portion being integrally joined to its wall portion by a chime, and an intermediate cylindrical wall portion having on its opposite ends inner key forming convolutions, said latter convolutions being engaged against the first convolutions to form circumferential tubes for receiving a pourable, hardening compound.

7. A cask comprising sheet metal heads having head portions and cylindrical wall portions, each head and wall portion being integrally joined by a chime; a cylindrical sheet metal member; and means for attaching said heads to said member; said means including outer circumferential key forming convolutions on the inner ends of said wall portions, and coacting inner convolutions on the opposite ends of said member, said inner convolutions being engaged against the outer convolutions to form circumferential tubes.

8. A cask comprising opposed sheet metal heads including cylindrical portions; a sheet metal tubular body shell; and means for attaching said heads to said shell; said means including outer circumferential key forming convolutions on the inner ends of said portions, each of said convolutions having therein a filling aperture, and coacting inner convolutions on the opposite ends of said shell; said respective inner and outer convolutions forming circumferential tubes, said apertures being adapted to receive a pourable, tube filling, hardening compound.

EDWARD G. COOK.